H. S. DODSON.
NEST.
APPLICATION FILED OCT. 11, 1920.
1,412,677.
Patented Apr. 11, 1922.
2 SHEETS—SHEET 1.
Fig. 1.
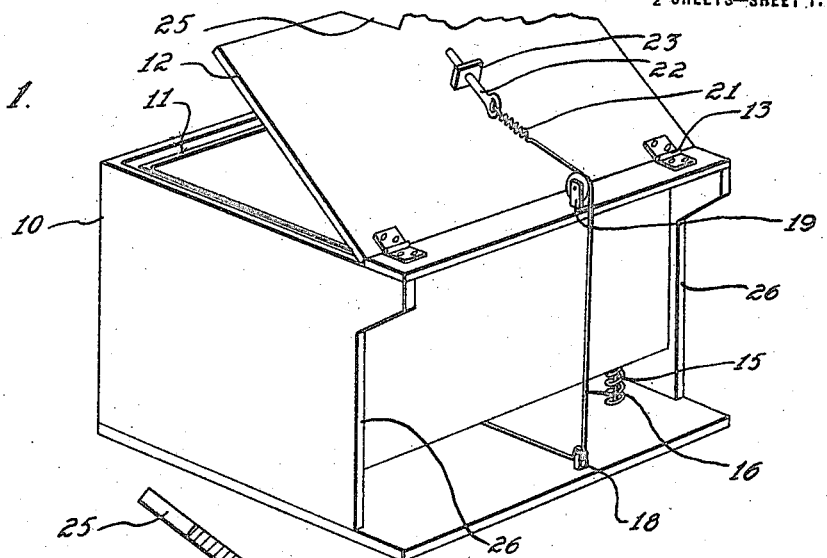
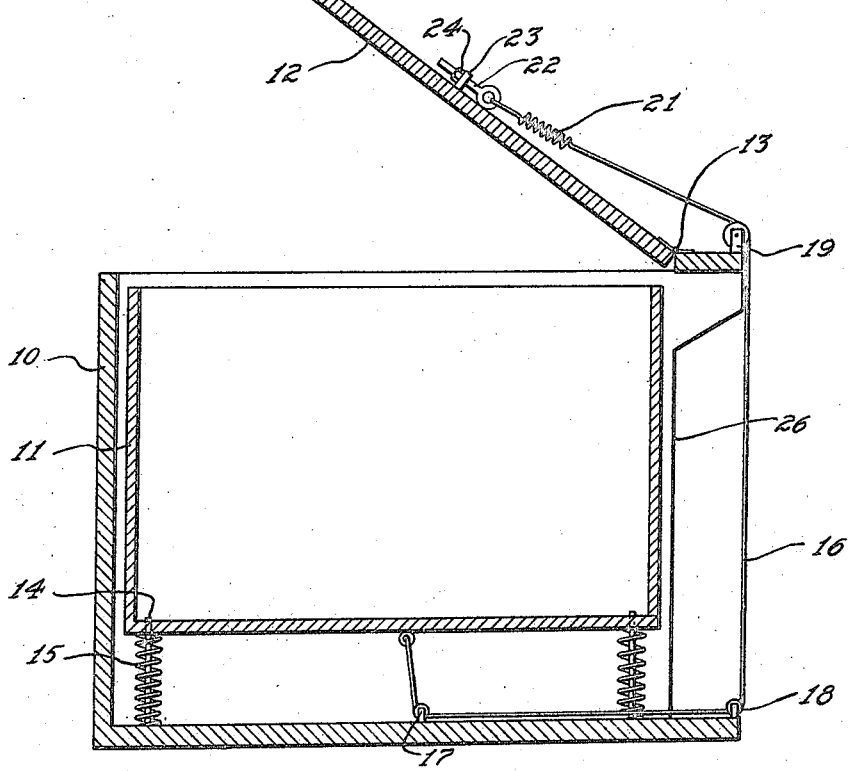
Fig. 2.
H. S. Dodson
INVENTOR
BY *Victor J. Evans*
ATTORNEY
WITNESS:

H. S. DODSON.
NEST.
APPLICATION FILED OCT. 11, 1920.
1,412,677.
Patented Apr. 11, 1922.
2 SHEETS—SHEET 2.
Fig. 3.
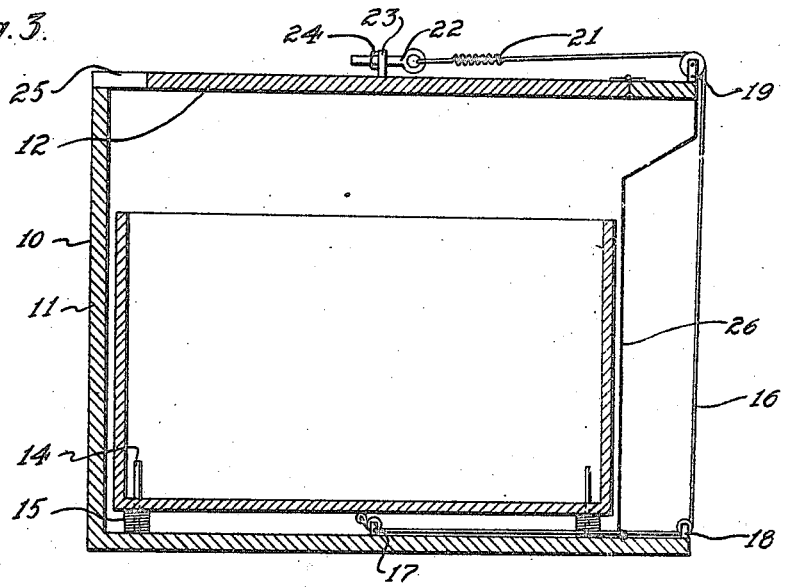
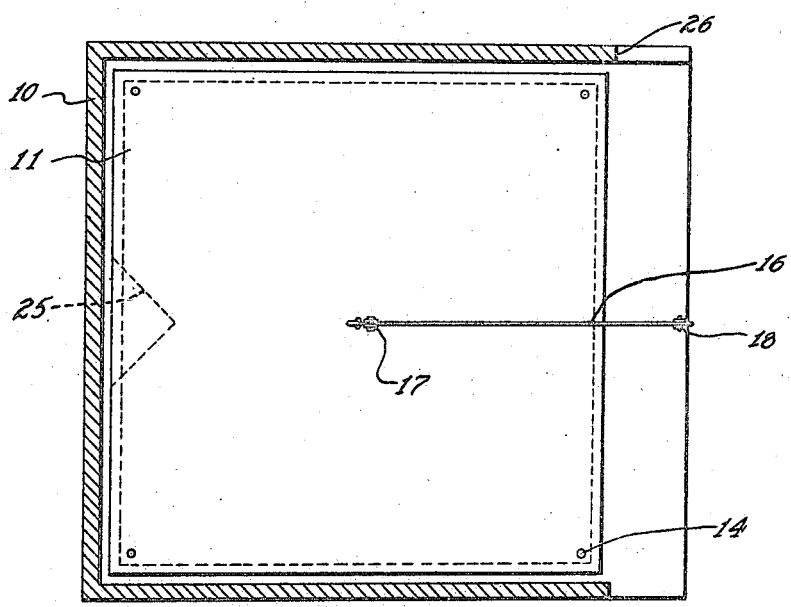
Fig. 4.
H. S. Dodson
INVENTOR
BY
ATTORNEY
WITNESS:

UNITED STATES PATENT OFFICE.

HUGH SANDFORD DODSON, OF RANKIN, OKLAHOMA.

NEST.

1,412,677.   Specification of Letters Patent.   Patented Apr. 11, 1922.

Application filed October 11, 1920. Serial No. 415,998.

*To all whom it may concern:*

Be it known that HUGH SANDFORD DODSON, a citizen of the United States, residing at Rankin, in the county of Roger Mills and State of Oklahoma, have invented new and useful Improvements in Nests, of which the following is a specification.

This invention relates to poultry nests and has for an object the provision of a nest having a normally open closure or cover which is automatically moved to a closed position by the weight of a fowl within the nest and thus prevents interference by another fowl when the former is laying or setting.

Another object is the provision of a nest of this character, wherein the occupant may open the cover or closure to leave the nest, the invention being especially useful for setting fowls as the cover will remain closed when the nest is occupied, yet may be opened by the occupant when the latter desires nourishment or exercise.

Other objects and advantages of the invention will appear as the following description is read in connection with the accompanying drawings.

In the drawings:—

Figure 1 is a perspective view of a nest embodying the present invention.

Figure 2 is a vertical longitudinal sectional view showing the nest open.

Figure 3 is a similar view with the nest closed.

Figure 4 is a horizontal section looking at the under side of the inner movable casing.

Referring to the drawings in detail, wherein like characters of reference denote corresponding parts, the nest is illustrated as comprising an outer casing 10 and an inner casing 11.

The outer casing is of box-like formation and is provided with an open top which is adapted to be closed by a lid or cover 12, one end of which is hinged to the outer casing as shown at 13.

The inner casing is also of box-like formation and open at the top and is of smaller dimension than the outer casing so as to be slightly spaced from the inner walls of the latter.

Extending upwardly from the bottom of the outer casing 10 is a number of rods 14 to provide guides for the inner casing which is capable of limited vertical movement. Mounted upon the rods 14 are coiled springs 15, the latter being interposed between the bottom of the casing 10 and the bottom of the casing 11, so that the last mentioned casing is yieldingly mounted.

Secured to the under side of the inner casing 11 is one end of a flexible member 16, the latter passing around a pulley 17 also secured to the under side of the inner casing. The flexible member 16 also passes around a pulley 18 secured to the outer casing 10 and upward around the pulley 19 also secured to this last mentioned casing. The extremity of the member 16 is connected to a coiled spring 21. This spring is also connected to the adjusting bolt 22 which passes through an apertured bracket 23 secured to the lid or cover 12 and is provided with an adjusting nut 24.

It is preferred to cut away the rear edges of the sides of the outer casing, as indicated at 26 and to leave the rear open as clearly shown in the drawings. This permits of ready access to the interior for the purpose of connecting the flexible member 16, or disconnecting the same when necessary, should the said member break. The rear of the inner casing 11 is spaced from the rear of the outer casing so as to facilitate the removal of the former.

In the use of the invention, a hen or other fowl may conveniently enter the nest which is provided within the inner casing 11, the length of the flexible member 16 being regulated so that when the nest is unoccupied the lid or cover 12 will be maintained in raised position. After the hen enters the nest, the weight of the former will move the inner casing 11 downward against the action of the springs 15 and thus slacken the flexible member 16 sufficiently to permit the lid or cover to close. When the hen desires to leave the nest she may raise the lid or cover 12 from the inside by poking her head through a notch 25 formed in the free end of the said lid or cover and first step upon the upper edge of the inner casing and then to the edge of the outer casing, whereupon the weight of the cover will be supported by the flexible member 16 due to the raising of the inner casing under the action of the spring 15.

The invention is susceptible of various changes in its form, proportions and minor details of construction and the right is herein reserved to make such changes as properly fall within the scope of the appended claim.

Having described the invention what is claimed is:

A nest comprising a receptacle, a normally open lid or closure therefor, a second nest receiving receptacle located within the first mentioned receptacle, a plurality of vertically arranged guide rods connecting the inner and outer receptacles for guiding the former, springs mounted upon said guide rods for yieldingly supporting the inner receptacle in a manner to permit of vertical movement of the latter, a cable having one end connected to the bottom of the inner receptacle, pulleys secured to the base and top of the outer receptacle for guiding the cable and means for adjustably connecting the opposite end of the cable to the lid or closure, whereby the weight of the occupant will permit the lid to close.

In testimony whereof I affix my signature.

HUGH SANDFORD DODSON.